US008171508B2

(12) United States Patent
Beaunoir et al.

(10) Patent No.: US 8,171,508 B2
(45) Date of Patent: May 1, 2012

(54) ENHANCED PARENTAL CONTROL

(75) Inventors: Nicolas Beaunoir, Suresnes (FR); Marc Juteau, Trembley en France (FR); Christophe Rault, Montainville (FR); Thierry Furet, Rambouillet (FR); Laurent Chauvier, Paris (FR)

(73) Assignee: NDS Technologies France, Moulineaux (FR)

( * ) Notice: Subject to any disclaimer, the term of this patent is extended or adjusted under 35 U.S.C. 154(b) by 377 days.

(21) Appl. No.: 12/159,457

(22) PCT Filed: Feb. 7, 2007

(86) PCT No.: PCT/GB2007/000435
§ 371 (c)(1),
(2), (4) Date: Oct. 14, 2008

(87) PCT Pub. No.: WO2007/138241
PCT Pub. Date: Dec. 6, 2007

(65) Prior Publication Data
US 2009/0320057 A1 Dec. 24, 2009

(30) Foreign Application Priority Data

May 30, 2006 (FR) ...................................... 06 04813

(51) Int. Cl.
*H04N 7/16* (2011.01)
(52) U.S. Cl. .......................................... 725/27; 725/28
(58) Field of Classification Search .................... 725/25, 725/27–30
See application file for complete search history.

(56) References Cited

U.S. PATENT DOCUMENTS

| 4,908,859 | A | | 3/1990 | Bennett et al. | |
|---|---|---|---|---|---|
| 5,548,345 | A | * | 8/1996 | Brian et al. | 725/27 |
| 5,828,402 | A | * | 10/1998 | Collings | 725/28 |
| 5,969,748 | A | * | 10/1999 | Casement et al. | 725/27 |
| 6,020,882 | A | | 2/2000 | Kinghorn et al. | |
| 6,529,526 | B1 | * | 3/2003 | Schneidewend | 370/486 |
| 7,533,400 | B1 | * | 5/2009 | Hailey et al. | 725/49 |
| 7,690,012 | B2 | * | 3/2010 | Luehrs | 725/28 |
| 2002/0109732 | A1 | | 8/2002 | Ward, III et al. | |
| 2003/0233651 | A1 | | 12/2003 | Farley et al. | |
| 2005/0166235 | A1 | | 7/2005 | Mears et al. | |

FOREIGN PATENT DOCUMENTS

| EP | 1 134 972 | | 9/2001 |
|---|---|---|---|
| EP | 1 134 972 | A | 9/2001 |
| GB | 2 349 290 | | 10/2000 |

(Continued)

OTHER PUBLICATIONS

ATSC Standard: Program and System Information protocol for Terrestial Broadcast and Cable (Revision C) with Amendment No. 1—A/65C Jan. 2, 2006—amendment No. 1 Dated May 9, 2006.*

(Continued)

*Primary Examiner* — Hai V Tran
(74) *Attorney, Agent, or Firm* — Ladas & Parry LLP

(57) ABSTRACT

A parental control method, including receiving a channel selection command from a user to select from a plurality of channels for playing, each of the channels having a plurality of programming content, performing a parental control procedure prior to allowing playing of the programming content of one of the channels, during at least one specific timeslot, and allowing playing of the programming content prior to performing a parental control procedure for at least one of the following the one channel outside of the at least one specific timeslot, and another one of the channels. Related apparatus and methods are also described.

14 Claims, 6 Drawing Sheets

FOREIGN PATENT DOCUMENTS

| | | | |
|---|---|---|---|
| GB | 2349290 A | * | 10/2000 |
| WO | 97/46016 | | 4/1997 |
| WO | 97/46016 | | 12/1997 |
| WO | 97/46016 A | | 12/1997 |

OTHER PUBLICATIONS

Page from Internet entitled "Parental Controls", Sky.com-Customer Support.

Patent Abstracts of Japan of JP 2001-202748 dated Jul. 27, 2001.

* cited by examiner

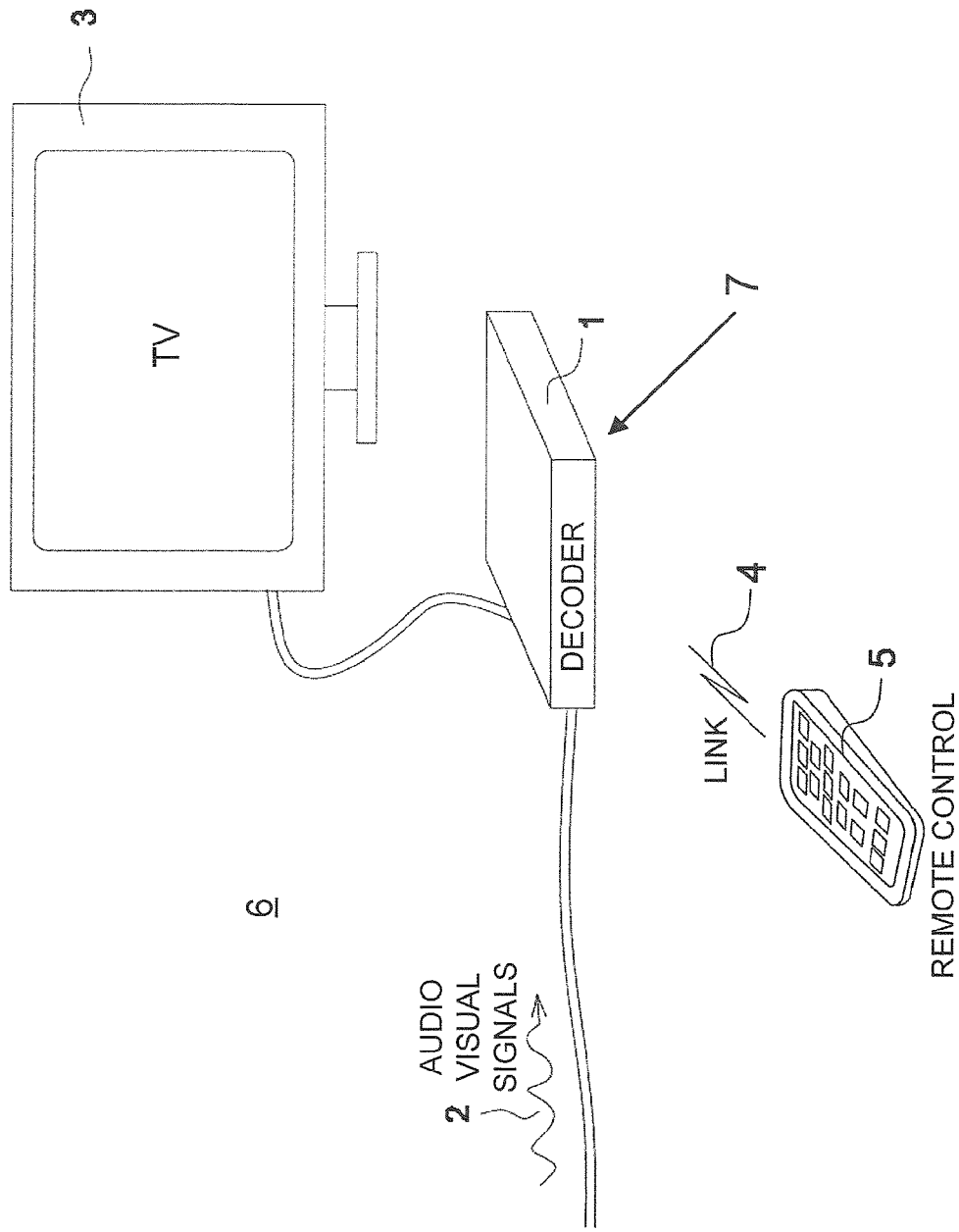

FIG. 2 –
| PCR LEVELS | EIT CODE |
|---|---|
| CATEGORY 1 | CODE 26 |
| CATEGORY 2 | CODE 27 |
| CATEGORY 3 | CODE 28 |
| CATEGORY 4 | CODE 29 |
| CATEGORY 5 | CODE 30 |
21 — CATEGORY 1
22 — CATEGORY 2
23 — CATEGORY 3
24 — CATEGORY 4
25 — CATEGORY 5
FIG. 3 -
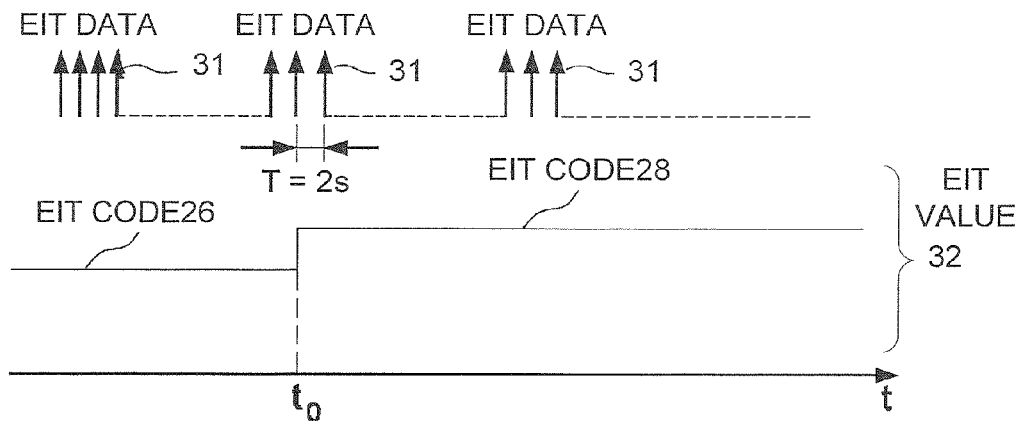
FIG. 4    PRIOR ART
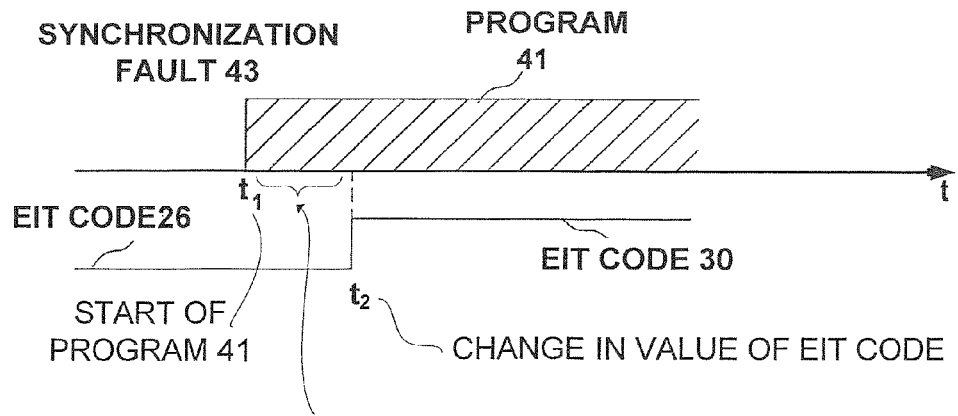
Non-authorized person could view program 41 between times $t_1$ and $t_2$

| GROUPS | CHANNELS |
|---|---|
| GROUP I | xxx |
| GROUP II | yyy |
| GROUP III | zzz |

FIG. 5

| | CHANNEL ID | FLAG | TIMESLOT |
|---|---|---|---|
| GROUP I | CHANNEL ID 1<br>CHANNEL ID 2<br>⋮<br>CHANNEL ID N | | |
| GROUP II | CHANNEL ID K<br>⋮<br>CHANNEL ID K+P | 1<br>⋮<br>1 | 0h – 5h<br>⋮<br>0h – 4h |
| GROUP III | CHANNEL ID L<br>⋮<br>CHANNEL ID L+Q | 0<br>⋮<br>0 | 0h – 5h<br>⋮<br>1h – 5h |

FIG. 6

ENHANCED PARENTAL CONTROL

The present application is a 35 USC §371 application of PCT/GB2007/000435, filed on 7 Feb. 2007 and entitled "Enhanced Parental Control", which was published on 6 Dec. 2007 in the English language with International Publication Number WO 2007/138241, and which relies for priority on French Patent Application Serial No. 06 04813 filed 30 May 2006 of NDS Technologies France.

FIELD OF THE INVENTION

The present invention relates to a system for parental control of TV programs.

BACKGROUND OF THE INVENTION

By way of introduction, TV program regulatory authorities, such as the CSA of France, require operators to support parental control in such a way as to prevent the viewing (or hearing) of programs for which parental control is critical, in an automatic fashion. In most countries, parental control is realized through the analysis of digital information that is transmitted by operators along with the programs. The digital information, which indicates the level of criticality of the programs, is generally transmitted along with other digital data containing the program title, synopsis and so on. All of the information is typically consolidated, for example, in an Event Information Table (EIT), such that parental control is realized through an analysis of the EIT data.

Parental control based on EIT analysis poses a number of problems. One problem is due to inadequate synchronization of the EIT data with the broadcast of the programming content. Inadequate synchronization can result in a non-authorized person viewing, in whole or in part, programming content for which parental control is critical.

Another problem lies in the standard EIT cycle time, which is generally two seconds. In order for parental control to be successful during channel surfing, the EIT data is first received prior to display of the video image, thereby causing a delay between zapping and display of the video. Many users regard the delay, which may be up to approximately two seconds, as being unduly long.

The following references are also believed to represent the state of the art:
U.S. Pat. No. 4,908,859 to Bennett, et al.;
U.S. Pat. No. 5,969,748 to Casement, et al.;
U.S. Pat. No. 6,020,882 to Kinghorn, et al.;
US Published Patent Application 2003/0233651 of Farley, et al.;
US Published Patent Application 2005/0166235 of Mears, et al.;
UK Patent Application GB 2 349 290 of NDS Limited; and
Japanese Patent Application Abstract JP2001202748 of Victor Company of Japan.

The disclosures of all references mentioned above and throughout the present specification, as well as the disclosures of all references mentioned in those references, are hereby incorporated herein by reference.

SUMMARY OF THE INVENTION

The present invention seeks to provide an improved parental control system.

The present invention, in preferred embodiments thereof, includes a system and method for improving parental control by treating different types of channels in different ways.

The invention, in preferred embodiments thereof, enables high quality parental control irrespective of the synchronization of the EIT data broadcast with a bouquet of channels. The invention, in preferred embodiments thereof, also enables efficient channel switching where appropriate. The invention is also generally low cost and easy to implement.

There is thus provided in accordance with a preferred embodiment of the present invention, a parental control method, including receiving a channel selection command from a user to select from a plurality of channels for playing, each of the channels having a plurality of programming content, performing a parental control procedure prior to allowing playing of the programming content of one of the channels, during at least one specific timeslot, and allowing playing of the programming content prior to performing a parental control procedure for at least one of the following the one channel outside of the at least one specific timeslot, and another one of the channels.

Further in accordance with a preferred embodiment of the present invention, the method includes maintaining a table, whereby the table includes a list of the channels, the channels being grouped in the table the programming content of the channels, the groups including a first group including the channels that do not include the programming content with a critical parental control rating, and at least one other group including the channels that do include the programming content with the critical parental control rating, searching the table to determine which of the groups the selected channel is a member of, wherein the allowing playing of the programming content prior to performing the parental control procedure is performed if the selected channel is a member of the first group, and the performing the parental control procedure prior to allowing the playing is performed if the selected channel is a member of the at least one other group.

Still further in accordance with a preferred embodiment of the present invention if the selected channel is a member of the at least one other group, the parental control procedure is performed prior to the allowing playing of the programming content of the selected channel only during the specific timeslot, whereas outside of the specific timeslot, the playing of the programming content of the selected channel is allowed prior to performing the parental control procedure.

Additionally in accordance with a preferred embodiment of the present invention, the method includes receiving a plurality of event information values for the programming content of the selected channel, wherein the other groups include a second group including the channels having the programming content which is synchronized with the event information values, and a third group including the channels having the programming content which is not synchronized with the event information values.

Moreover in accordance with a preferred embodiment of the present invention the event information values include an event information code associated with a parental control rating of the programming content of the selected channel, if the selected channel is a member of the second group and at least during the specific timeslot the parental control procedure includes checking the event information code in order to decide whether to request user entry of a parental control code prior to allowing playing of the programming content of the selected channel, and if the selected channel is a member of the third group and at least during the specific timeslot, the parental control procedure includes requesting user entry of the parental control code, prior to allowing playing of the programming content of the selected channel, irrespective of any of the event information values.

Further in accordance with a preferred embodiment of the present invention the parental control procedure includes requesting user entry of a parental control code to allow playing of the programming content of the selected channel.

Still further in accordance with a preferred embodiment of the present invention when entry of a parental control code has been requested, the programming content of the selected channel is not played until the earlier of the parental control code being entered, and an end of the specific time slot.

Additionally in accordance with a preferred embodiment of the present invention, the method includes receiving a plurality of event information values including an event information code associated with a parental control rating of the programming content of the selected channel, wherein the parental control procedure includes checking the event information code.

There is also provided in accordance with still another preferred embodiment of the present invention a parental control method, including receiving a channel selection command from a user to select one of a plurality of channels for playing, each of the channels having a plurality of programming content, receiving a plurality of event information values for the programming content of the selected channel, the event information values including an event information code associated with a parental control rating of the programming content of the selected channel, maintaining a table, whereby the table includes a list of the channels, the channels being grouped in the table the programming content of the channels, the groups including a first group including the channels having the programming content which is synchronized with the event information values, and a second group including the channels having the programming content which is not synchronized with the event information values, searching the table to determine which of the groups the selected channel is a member of, performing a parental control procedure, including checking the event information code, in order to decide whether to request user entry of a parental control code prior to allowing playing of the programming content of the selected channel if the selected channel is a member of the first group and at least during the specific timeslot, and performing a parental control procedure, including requesting user entry of the parental control code prior to allowing playing of the programming content of the selected channel, irrespective of any of the event information values, if the selected channel is a member of the second group and at least during the specific timeslot.

There is also provided in accordance with still another preferred embodiment of the present invention a decoder device, including a processor arrangement operative to receive a channel selection command from a user to select from a plurality of channels for playing, each of the channels having a plurality of programming content, perform a parental control procedure prior to allowing playing of the programming content of one of the channels, during at least one specific timeslot, and allow playing of the programming content prior to performing a parental control procedure for at least one of the following the one channel outside of the at least one specific timeslot, and another one of the channels.

Moreover in accordance with a preferred embodiment of the present invention the processor arrangement is also operative to maintain a table, whereby the table includes a list of the channels, the channels being grouped in the table the programming content of the channels, the groups including a first group including the channels that do not include the programming content with a critical parental control rating, at least one other group including the channels that do include the programming content with the critical parental control rating, search the table to determine which of the groups the selected channel is a member of, allow playing of the programming content prior to performing the parental control procedure if the selected channel is a member of the first group, and perform the parental control procedure prior to allowing the playing the programming content if the selected channel is a member of the at least one other group.

Further in accordance with a preferred embodiment of the present invention if the selected channel is a member of the at least one other group, the processor arrangement is operative to perform the parental control procedure prior to allowing playing of the programming content of the selected channel only during the specific timeslot, whereas outside of the specific timeslot, the processor arrangement is operative to allow playing of the programming content of the selected channel prior to performing the parental control procedure.

Still further in accordance with a preferred embodiment of the present invention the processor arrangement is operative to receive a plurality of event information values for the programming content of the selected channel, wherein the other groups include a second group including the channels having the programming content which is synchronized with the event information values, and a third group including the channels having the programming content which is not synchronized with the event information values.

Additionally in accordance with a preferred embodiment of the present invention the event information values include an event information code associated with a parental control rating of the programming content of the selected channel, if the selected channel is a member of the second group and at least during the specific timeslot, the parental control procedure includes checking the event information code in order to decide whether to request user entry of a parental control code prior to allowing playing of the programming content of the selected channel, and if the selected channel is a member of the third group and at least during the specific timeslot, the parental control procedure includes requesting user entry of the parental control code, prior to allowing playing of the programming content of the selected channel, irrespective of any of the event information values.

Moreover in accordance with a preferred embodiment of the present invention the parental control procedure includes requesting user entry of a parental control code to allow playing of the programming content of the selected channel.

Further in accordance with a preferred embodiment of the present invention when entry of a parental control code has been requested the processor arrangement is operative such that programming content of the selected channel is not played until the earlier of the parental control code being entered, and an end of the specific time slot.

Still further in accordance with a preferred embodiment of the present invention the processor arrangement is operative to receive a plurality of event information values including an event information code associated with a parental control rating of the programming content of the selected channel, wherein the parental control procedure includes checking the event information code.

There is also provided in accordance with still another preferred embodiment of the present invention a decoder device, including a processor arrangement operative to receive a channel selection command from a user to select one of a plurality of channels for playing, each of the channels having a plurality of programming content, receive a plurality of event information values for the programming content of the selected channel, the event information values including an event information code associated with a parental control rating of the programming content of the selected channel, maintain a table, whereby the table includes a list of the channels, the channels being grouped in the table the programming content of the channels, the groups including a first group including the channels having the programming content which is synchronized with the event information values, and a second group including the channels having the programming content which is not synchronized with the event information values, search the table to determine which of the groups the selected channel is a member of, perform a parental control procedure, including checking the event information code, in order to decide whether to request user entry of a parental control code prior to allowing playing of the programming content of the selected channel if the selected channel is a member of the first group and at least during the specific timeslot, and perform a parental control procedure, including requesting user entry of the parental control code prior to allowing playing of the programming content of the selected channel, irrespective of any of the event information values, if the selected channel is a member of the second group and at least during the specific timeslot.

BRIEF DESCRIPTION OF THE DRAWINGS

The present invention will be understood and appreciated more fully from the following detailed description, taken in conjunction with the drawings in which:

FIG. 1 is a schematic view of a television system including a parental control sub-system constructed and operative in accordance with a preferred embodiment of the present invention;

FIG. 2 is a view of a table listing the various levels of parental control for use in the system of FIG. 1;

FIG. 3 is a schematic view showing EIT codes of programs that are broadcast with EIT data against time of the system of FIG. 1;

FIG. 4 is a schematic view of a synchronization fault whereby the transmission of the EIT data of a program is not synchronized with the broadcast of the program in the system of FIG. 1;

FIG. 5 is a view of a channel group table for use in parental control sub-system of FIG. 1;

FIG. 6 is a more detailed view of the channel group table of FIG. 5;

FIG. 9b is a more detailed view of the third control mode of FIG. 9a; and

DETAILED DESCRIPTION OF A PREFERRED EMBODIMENT

Figure 7:
FIG. 7 is a schematic view of a first control mode in the parental control sub-system of FIG. 1.

Reference is now made to FIG. 1, which is a schematic view of a television system 6 including a parental control sub-system 7 constructed and operative in accordance with a preferred embodiment of the present invention.

A decoder 1 receives audiovisual signals 2 carrying the TV programming content, for any channel, as well as the accompanying digital data. The decoder 1 receives TV channels and then supplies the programs selected by a user to an associated TV 3. The parental control sub-system 7 is typically implemented in the decoder 1.

A link 4 is established between the decoder 1 and a remote control 5, which enables program selection. The remote control 5 also allows the user to enter interactive information that is transmitted to the decoder 1, and in particular, to enter a secret parental control code (PCC) whose value can be configured when the decoder 1 is installed.

After configuration, depending on how the decoder 1 has been programmed, the decoder 1 may require that the PCC be entered before specific programs are accessed. In order to enable parental control of programs, the digital data supplied by operators (via the same channels as the video signals 2) includes a plurality of event information values, or event information table (EIT) data, which includes a data indicative of a parental control rating (PCR) for each program. The PCR indicates the category of viewer that is permitted to access the specific program. The PCR or equivalent data, included in the EIT data mentioned above, is provided along with other programming related information such as the title and content synopsis.

The following description described with reference to FIGS. 1-4 assumes that the decoder 1 is operative to perform parental control for all channels in a similar way.

While tuned to a particular channel, if the decoder 1 detects, via the EIT data, that a program requires entry of a PCC, the decoder 1 stops playing the program on the TV 3 and displays, on the screen of the TV 3, a request to enter the parental control code (PCC) using the remote control. If the correct PCC is entered, the program is then played on the TV 3. When zapping to a new channel, the decoder 1 typically waits until the EIT data is received prior to playing the program in order to check if parental control should operate before playing the program. The term "playing" or "play", and in all grammatical forms thereof, as used in the specification and claims, is defined as displaying video, and preferably playing sound, on the TV 3 or any other suitable output device or arrangement of output devices for displaying video and playing sound, for example, but not limited to, a combined TV and set-top-box system or using a projection screen with a loud-speaker system.

The PCRs that require entry of a PCC are typically programmed when the decoder 1 is installed or at any subsequent time. In general, the decoder 1 is configured to require mandatory entry of the PCC for programs with the highest PCR, by default, which means that the user cannot generally disable the parental control function for the highest PCR.

Reference is now made to FIG. 2, which is a view of a table listing a plurality of various PCR levels 21, 22, 23, 24, 25 for use in the system 6 of FIG. 1. In the example of FIG. 2, the five PCR levels 21, 22, 23, 24, 25 correspond to five categories of programs, namely categories 1, 2, 3, 4, 5, respectively. Each of the categories 1, 2, 3, 4, 5, is associated with an item of the EIT data, a code 20. The categories 1, 2, 3, 4, 5 are associated with EIT codes 26, 27, 28, 29, 30, respectively. Category 1 programs are permitted for all viewers. The next categories 2, 3, 4, 5 are restricted to viewers older than 10, 12, 16 and 18, respectively, by way of example only. The programs in the category 5 are generally considered "critical" as category 5 is frequently mandated by Law to be subjected to parental control. However, it will be appreciated by those ordinarily skilled in the art that one or more of the other categories of programs may be defined as critical for the purposes of the system 6.

Reference is now made to FIG. 3, which is a schematic view showing EIT codes 26, 28 that are broadcast with EIT data 31 against time t of the system 6 of FIG. 1. FIG. 3 shows the time T it takes for cyclical transmission of the EIT data 31, as well as a value 32 for each of the items of the EIT data 31.

For example, the EIT data 31 is transmitted in accordance with a period T, which equals 2 seconds.

In the example of FIG. 3, the items of EIT data 31 are first allocated the code 26 which corresponds to a program from category 1. At a given moment $t_0$, the value embedded in the items of EIT data 31 changes, for example, to the code 28 that corresponds to a program from category 3. The EIT data 31 is transmitted along with the video signals 2 (FIG. 1) of the TV program.

The time period T that elapses between the transmission of two consecutive items of the EIT data 31 can degrade channel switching performance (the time it takes to switch channels), particularly if the decoder 1 (FIG. 1) is programmed for parental control. Thus, each time the channel is changed, before the program is played, the decoder 1 must verify that access to the channel is allowed without entry of a PCC.

For example, if parental control has been programmed for category 1 and 2, before allowing play of the program on the TV 3, the decoder 1 generally needs to check whether the program is in a category that requires entry of a PCC. Therefore, the decoder 1 must first check the EIT data before playing the program.

The waiting period for a new occurrence of EIT data can last a maximum of period T, which is 2 seconds in the example of FIG. 3. Thus, when the user changes channels, the user may have to wait approximately an additional two seconds (in addition to a delay due to tuning to the channel) before being able to consume the selected program. The waiting time may be considered too long by the user.

Reference is now made to FIG. 4, which is a schematic view of a synchronization fault 43 whereby the transmission of the EIT data 31 of a program 41 is not synchronized with the broadcast of the program 41 in the system 6 of FIG. 1. The program 41 begins at time $t_1$, whereas the change in the value of the EIT data (which indicates a change in the program category) occurs at time $t_2$, which is after the time $t_1$.

The time interval between times $t_1$ and $t_2$ may vary according to the operator involved and in some cases may be nearly zero, which means that the operator adheres completely to the broadcast schedule. However, in the case of other operators, the time interval between the times $t_1$ and $t_2$ may be in the order of minutes, by way of example only. In the example of FIG. 4, the program 41 broadcast is in the category 5 (for which parental control is especially critical) having the associated EIT code 30.

During the time that elapses between $t_1$ and $t_2$, a non-authorized person, such as a child, could view and hear the beginning of the program 41. It is only after the time $t_2$, when the EIT code 30 is detected, that the image and sound of the program 41 cease from the TV 3 and a request screen requesting user entry of the PCC is displayed on the screen of the TV 3.

Some operators, particularly those that broadcast channel packages, may have difficulty synchronizing programming content with the EIT data. The synchronization problems may be attributable to technical problems at the broadcast level, or may result from previous programs, for example, but not limited to, live events, running longer than the allotted time slot.

Reference is now made to FIG. 5, which is a view of a channel group table 50 maintained for use in the parental control sub-system 7 of FIG. 1 constructed and operative in accordance with the preferred embodiment of the present invention. In accordance with the preferred embodiment of the present invention, the channels received by the decoder 1 (FIG. 1) are divided into three groups, a group I, II and II. The table 50 includes a list of channels 55, 56, 57 which are grouped according to the programming content of the channels as described in more detail below.

The group I (labeled 51) includes a plurality of channels 55 not including programming content that has a critical PCR. Programs with a critical PCR are typically programs of the category 5 PCR level. By way of example, if category 5 is alone chosen as the critical PCR level then group I will include channels not including programs having a PCR associated with category 5. However, it will be appreciated by those ordinarily skilled in the art that that one or more of the other PCRs may be defined as critical PCRs and thereby excluded from the group I.

The group II (labeled 52) includes a plurality of channels 56 including programming content having a critical PCR (for example, a category 5 PCR) in which the program(s) are synchronized, during one or more specific timeslots, with the corresponding EIT values.

The group III (labeled 53) includes a plurality of channels 57 having programming content having a critical PCR (for example, a category 5 PCR) in which the program(s) are not synchronized, during one or more specific time slots, with the corresponding EIT values.

For the purposes of defining groups I, II and III, the critical PCR is generally a category 5 PCR level. However, it will be appreciated by those ordinarily skilled in the art that that one or more of the other PCR levels (1, 2, 3, and/or 4) may be defined as critical PCRs for the definition of groups I, II and III.

The decision as to whether a channel is considered a synchronized channel, or not, is generally made according to the constraints and criteria of the platform operator. Nevertheless, as a general guideline, a channel is considered as synchronized if the correct EITs for a program are transmitted within the normal EIT transmission cycle time from the beginning of a program, for example, within the first two seconds of the program.

The table 50 is typically embedded in the decoder 1, namely in the memory area of the decoder 1 described in more detail with reference to FIG. 10. The memory is typically a hard drive, a RAM or flash memory, by way of example only. The table 50 constitutes a descriptor that specifies a list of the channels 55, 56, 57 that are associated with each group 51, 52, 53, respectively.

Reference is now made to FIG. 6, which is a more detailed view of the channel group table 50 of FIG. 5. The table 50 is typically an MPEG or MPEG type table. Each address of the table 50 points to a field. The table 50 includes a group column 66, a channel ID column 67, a binary information "flag" column 68 and a timeslot information column 69. The binary information (referred to hereinafter as a "flag") indicates whether or not the programs for the channel are synchronized with the EIT data for the programs. A flag value of 1 indicated synchronization of the EIT data with the programs and a flag value of 0 indicates non-synchronization of the EIT data with the programs.

As described above, the table 50 includes four columns. The column 66 stores the groups, the column 67 stores the channel identifiers, the column 68 stores the values of the flag and the column 69 stores the time slots. The fields, of the table 50, store the data associated with each column, such as the groups, associated channel IDs, flags and time slot for each channel.

A first data region 61 of the table 50 is reserved for fields associated with the group I channels. In the first data region 61, the columns 68, 69 are not used.

A second data region 62 of the table 50 is reserved for fields associated with the group II channels. In the second data region the fields of the flags column 68 equal 1 and a time slot is typically associated with each channel.

A third data region 63 of the table 50 is reserved for fields associated with the group III channels. In the third data region, the fields of the flag column 68 equal 0 and a time slot is typically associated with each channel.

By way of example, the time slots generally fall between midnight and 5 a.m., although other timeslots are of course possible.

The operators know the channel characteristics and are able to describe them. Therefore, the operators are able to divide the channels into the groups and assign flags and time slots. The information created by the operator is transmitted by the operator via the normal transmission channels. A program running in the decoder 1 (FIG. 1) retrieves the information and builds the table 50. The table 50 can be updated or extended as new channels are created or old channels are deleted or amended.

Reference is now made to FIG. 7, which is a schematic view of a first control mode in the parental control sub-system 7 of FIG. 1. FIG. 7 shows the processing of group I channels by the decoder 1 (FIG. 1).

As described above with reference to FIG. 6, the properties of the channels that are known to the operators are included in the table 50 enabling scanning of the table 50 addresses by the decoder 1 while each channel is set up in the table 50. During the scanning, the decoder 1 classifies the channels between the three groups.

FIG. 7 shows a time slot 71, for a day, for the group I channels. When a channel in the group I is selected, anywhere in the time slot 71, the decoder 1 (FIG. 1) first plays the selected program on the TV 3 (FIG. 1) and then performs a parental control check, if necessary.

If parental control has not been configured by the parents to include programs of a level other than the critical PCRS, the TV program continues to be played and the transmitted EIT data is ignored as channels including programs of critical PCRs are not included in the group I.

If however, parental control has been programmed by the parents to block programs including PCRs other than the critical PCRs, the decoder 1 checks the EIT data and may ask the user to enter the PCC depending on the EIT received. For example, if the parents have configured the decoder 1 to request user entry of a PCC for category 3 and 4 programs, then a PCC will be requested if the EIT data indicates that the program has a code of 28 or 29 corresponding to category 3 and 4 PCR levels, respectively (see table 20 of FIG. 2).

Therefore, channel-switching time is reduced as the program is first played and then the parental control check is performed (if relevant) and the PCC will be requested, if necessary.

Figure 8:
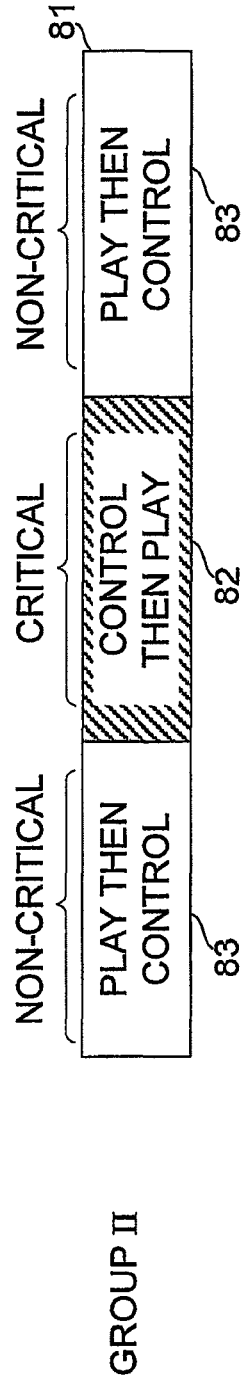
FIG. 8 is a schematic view of a second control mode in the parental control sub-system of FIG. 1.

Reference is now made to FIG. 8, which is a schematic view of a second control mode in the parental control sub-system 7 of FIG. 1. FIG. 8 shows the handling of a group II channel. The group II channel includes category 5 programs where parental control is critical. Additionally, the programming content of the group II channel does not have synchronization problems with the EIT data. A time slot 81, for a day, for the group II channel is shown. Category 5 programs are only broadcast during a specific time slot 82 of the time slot 81. The time slot 82 occurs between midnight and 5 a.m., by way of example only. In one or more timeslots 83 outside of the specific time slot 82, the decoder 1 handles programs in the same manner as described with reference to FIG. 7 for group I channels (in other words, the decoder 1 first plays the program and then performs a parental control check, if necessary). Therefore, when a user selects the group II channel outside of the specific time slot 82, the program is played immediately in the same fashion as for group I channels.

During the specific time slot 82, when the channel is selected, the EIT code must be assessed before the program is played. In other words, a parental control check is performed by decoder 1 before allowing playing of the program. For example, if a category 5 program is being broadcast, the PCC is requested in all cases. Similarly, if the parents also require entry of a PCC for other categories, for example, but not limited to, category 4 programs, then if a category 4 program is detected via the EIT code during the time-slot 82, a PCC will be requested prior to playing the program.

If the EIT code changes so that the PCR is not critical, nor a required PCR set by the parents, the program is automatically played.

Figure 9A:
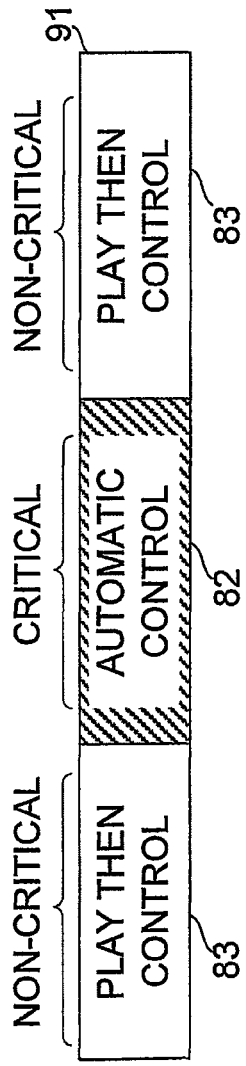
FIG. 9a is a schematic view of a third control mode in the parental control sub-system of FIG. 1.

Reference is now made to FIG. 9a, which is a schematic view of a third control mode in the parental control subsystem 7 of FIG. 1. FIG. 9a shows the handling of a group III channel. The group III channel includes category 5 programs where parental control is critical. Additionally, the programming content of the group III channel is generally not synchronized with the EIT data. A time slot 91, for a day, for the group III channel is shown. Similar to group II channels described with reference to FIG. 8, category 5 programs can only be shown during the specific time slot 82. When the group III channel is selected during the time slot 82, the decoder 1 requests that the PCC be entered, irrespective of the program that the channel happens to be broadcasting.

Figure 9B:
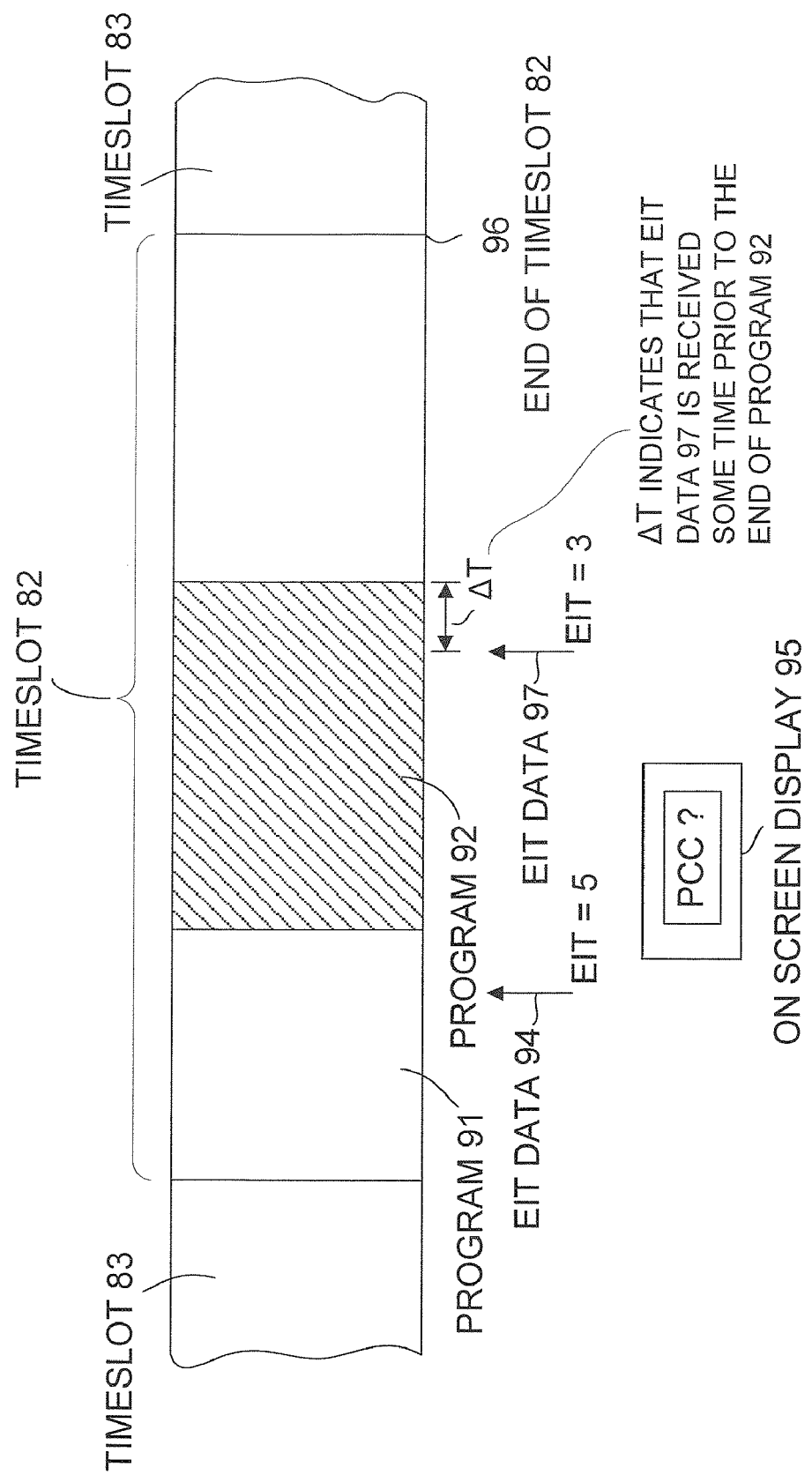

Reference is now made to FIG. 9b, which is a more detailed view of the third control mode of FIG. 9a showing an example of category 5 program control. From the beginning of the specific time slot 82, the parental code is requested each time the channel is accessed or when the user is already tuned to the channel before the timeslot 82 and then the timeslot 82 begins. In the example of FIG. 9b, the specific time slot 82 begins with a category 3 program 91. Owing to a synchronization problem, a packet 94 of the EIT data is received having a category 5 program code associated with a future program 92, while the category 3 program 91 is still being broadcast. Upon receipt of the EIT data packet 94, the decoder 1 requests a PCC to be entered, via an on-screen display 95, before the program 91 (category 3) is allowed to continue playing. The on-screen display 95 of the PCC request is continually displayed until the correct PCC is entered by the user or until the end 96 of the timeslot 82, whichever is sooner. The on-screen display 95 is only removed by entry of the PCC or reaching the end 96 of the timeslot 82, but not on receiving a non-critical PCR in the EIT data. As a result, if an authorized person (a person who knows the correct PCC) is not present or does not grant authorization, the on-screen display 95 is not removed. Even if, prior to the end of the category 5 program 92, a packet 97 of EIT data having a non-critical PCR (for example, category 3) is received, the on-screen display 95 is not removed without entry of the PCC.

If the correct PCC 95 is entered, the program 91 resumes playing. At some future time, the program 92 (category 5) starts playing without entry of an additional PCC.

In the timeslots 83 outside of the specific time slot 82, the decoder 1 handles programs in the same manner as described with reference to FIG. 7 for group I channels (in other words, the decoder 1 first plays the program and then performs a parental control check, if necessary).

Figure 10:
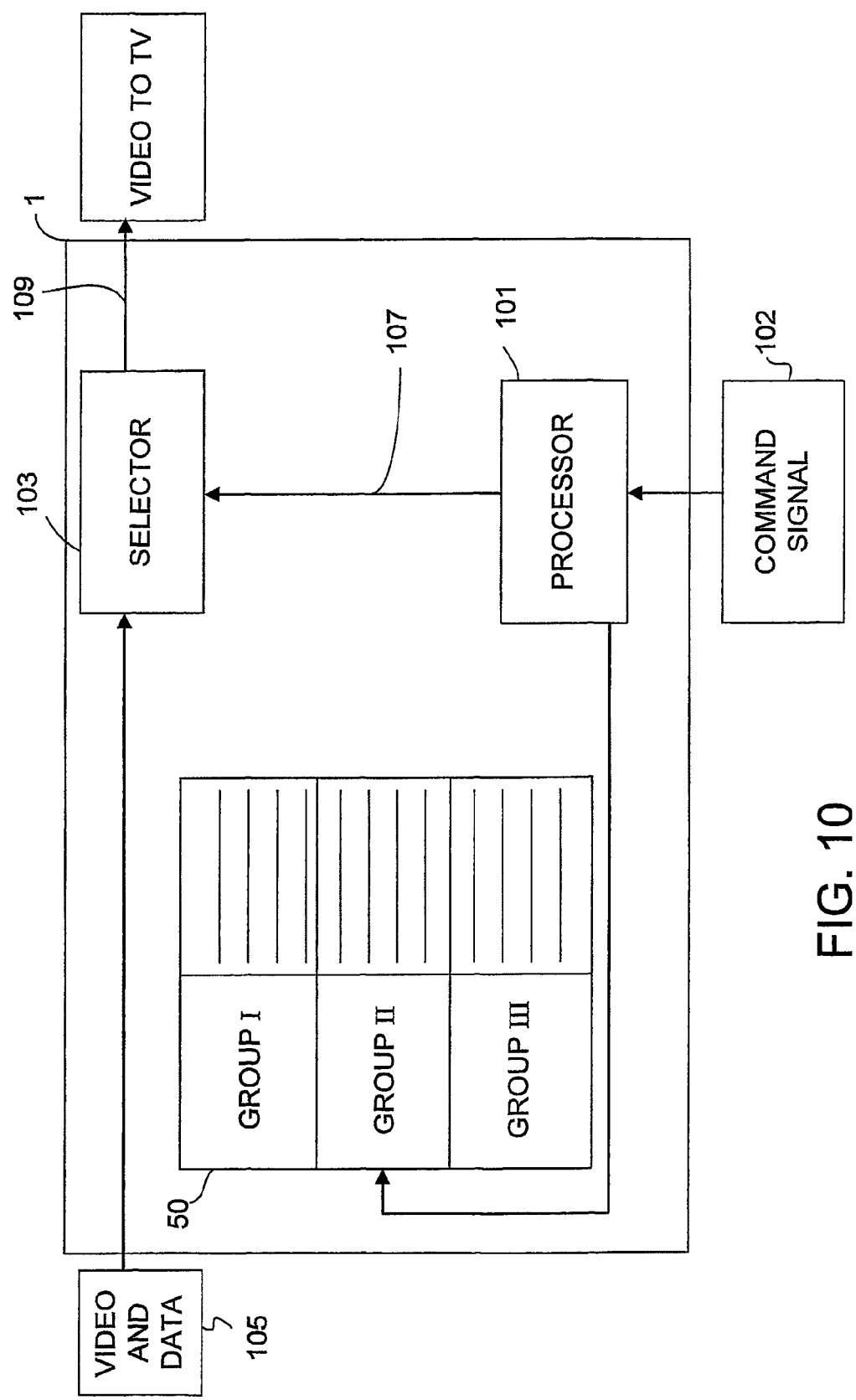
FIG. 10 is a schematic view of a decoder of the system of FIG. 1.

Reference is now made to FIG. 10, which is a schematic view of the decoder 1 of the system 6 FIG. 1. The decoder 1 is operative to perform the functions described above with reference to FIGS. 1-9b. The decoder 1 includes a processor arrangement 101 including one or more processors (not shown) and an associated memory (not shown) to analyze digital data that is broadcast by the operators along with a video stream 105. The decoder 1 also includes signal reception technology (not shown) for receiving the digital data and the video stream 105. The decoder 1 also includes a video stream selector 103 which receives a bouquet of channels in the video stream 105 via the signal reception technology. The video stream selector 103 is operative to select one of the channels from the video stream 105 based on a signal 107 from the processor.

Channel changing is now described below.

The user decides to select a channel and typically uses the remote control 5 (FIG. 1) to perform the channel selection. The processor arrangement 101 of the decoder 1 receives a command signal 102 from the user via the remote control 5 (FIG. 1) in order to select one of the channels for playing the programming content of the channel. The command signal 102 includes an identifier of the channel which has been selected. The processor arrangement 101 searches the table 50, which is stored in a dedicated memory area of the processor arrangement 101, in order to determine the group of the channel. The table 50 includes the channel ID 67 as well as other properties, as described above with reference to FIG. 6.

The control mode used by the processor arrangement 101 of the decoder 1 is based on the channel group of the selected channel.

If the selected channel is a group I channel member, the processor arrangement 101 allows playing the programming content of the selected channel by sending the signal 107, including the channel identifier of the selected channel, to the video stream selector 103, allowing selection of a video stream 109 of the selected channel based on the channel identifier. The video stream 109 of the selected channel is then transmitted to the TV 3 (FIG. 1) or other suitable output device. After sending the signal 107 to the video stream selector, the processor arrangement 101 performs a parental control procedure by analyzing the EIT code of the EIT data periodically received by the processor arrangement 101. If no PCC is required, no further action is taken by the processor arrangement 101. If the processor arrangement 101 determines that a PCC is required, the processor arrangement 101 issues a command to the video stream selector 103 to cease playing of the program and to display an on-screen display requesting entry of the PCC on the TV 3 (FIG. 1) for example.

If the selected channel is a member of group II or group III, during the specific (critical) time slot 82, the processor arrangement 101 is operative to perform a parental control procedure prior to allowing playing of the programming content of the selected channel; whereas outside of the specific time slot, the playing of the programming content of the selected channel is allowed prior to performing the parental control procedure, as described in more detail below. The parental control procedure is typically either: requesting user entry of a PCC without analyzing the EIT code, wherein the request is maintained until the correct PPC is entered or until the specific time slot ends, whichever is earlier (Group III channels); or analyzing or checking the EIT code and then requesting user entry of a PCC if necessary (Group II channels), wherein the request is maintained until the correct PCC is entered or until the EIT code changes to a non-enforced PCR level, whichever is earlier, as described in more detail below.

If the selected channel is a group II channel member, the processor arrangement 101 queries a clock (not shown) of the decoder 1 or any other suitable time signal in order to determine the current time. If the command signal 102 is received outside of the specific (critical) time slot 82, the processing procedure is identical to that of a group I channel described above. If the command signal 102 is received during the time slot 82, the processor arrangement 101 first performs the parental control check against the next received EIT code (associated with the PCR of the current programming content of the selected channel) in order to decide whether to request user entry of a PCC prior to allowing playing of the programming content of the selected channel. If the correct PCC is entered or if a PCC is not necessary, the processor arrangement 101 then allows playing of the programming content of the selected channel by transmitting the signal 107 allowing the video stream selector 103 to select the video stream 109 of the selected channel. The PCC is typically entered by the user using the remote control 5 (FIG. 1) and is transmitted from the remote control 5 as the command signal 102. As more EIT data is received, parental control checks are performed and a PCC is requested as necessary. The processor arrangement 101 does not allow selection of the programming content of the selected channel by the video stream selector 103 (and therefore playing of the programming content of the selected channel) until a valid PCC is entered by the user, or until the end of the timeslot 82, or an EIT code is received which does not require entry of a PCC, whichever is sooner.

If the selected channel is a group III channel member, the processor arrangement 101 queries the clock (not shown) of the decoder 1 or any other suitable time signal in order to determine the current time. If the command signal 102 is received outside of the specific (critical) time slot 82, the processing procedure is identical to that of a group I channel described above. If the command signal 102 is received during the time slot 82, the processor arrangement 101 of the decoder 1 first launches an on-screen display on the TV 3 (FIG. 1) requesting entry of the PCC, irrespective of any event information data, prior to allowing playing of the programming content of the selected channel. The PCC is typically entered by the user using the remote control 5 (FIG. 1) and is transmitted from the remote control 5 as the command signal 102. The processor arrangement 101 does not allow selection of the selected channel by the video stream selector 103 (and therefore playing of the programming content of the selected channel) until a valid PCC is entered by the user or until the end of the timeslot 82, whichever is sooner.

It is appreciated that software components of the present invention may, if desired, be implemented in ROM (read only memory) form. The software components may, generally, be implemented in hardware, if desired, using conventional techniques.

It will be appreciated that various features of the invention which are, for clarity, described in the contexts of separate embodiments may also be provided in combination in a single embodiment. For example, the parental control sub-system 7 may be implemented whereby for some, or all of the channels, during one or more specific time periods, a parental control procedure is performed prior to allowing playing of the programming content, whereas for other time periods the programming content is played prior to performing a parental control procedure. For example, the parental control sub-system 7 may be implemented whereby channels are divided in to groups of synchronized and non-synchronized channels such that for non-synchronized channels a PCC is requested irrespective of received event information values whereas for synchronized channels a PCC is only requested based on received event information. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A parental control method, comprising:
receiving a channel selection command from a user to select a channel from a plurality of TV channels, wherein the selected channel has programming content in a plurality of timeslots, including a first timeslot including programming content within a first defined category having a higher need for parental control than the programming content in other of the plurality of timeslots;
receiving a plurality of event information values including an event information code associated with a parental control rating of the programming content of the selected channel for each of the plurality of timeslots;
ascertaining whether the selected channel was selected within the first timeslot or within another timeslot wherein all of the programming content is within one or more defined categories with a lower need for parental control than the programming content within the first defined category, and
(a) if the selected channel was selected within the first timeslot, delaying play of the programming content after receipt of the channel selection while either (i) checking the event information code for the selected channel in the first timeslot to determine if the event information code corresponds to a predetermined parameter and, if it does, displaying a request for entry of a parental control code and awaiting entry of a parental control code, or (ii) displaying a request for entry of a parental control code and awaiting entry of a parental control code; and
(b) if the selected channel was selected within the other timeslot, allowing play of the programming content on the selected channel after receipt of the channel selection without a delay to check the event information code for the selected channel in the other timeslot and, after the programming content has started playing, checking the event information code for the selected channel in the other timeslot to determine if the event information code corresponds to a predetermined parameter and, only if it does, stopping play of the programming content on the selected channel, displaying a request for entry of a parental control code and awaiting entry of a parental control code.

2. The method according to claim 1, further comprising:
maintaining a table, whereby the table includes a list of the plurality of TV channels, the plurality of TV channels being grouped in a plurality of groups, the groups including:
a first group, the channels in the first group not including any programming content having a critical parental control rating; and
at least one other group, the channels in the at least one other group including programming content having the critical parental control rating;
searching the table to determine which of the groups the selected channel is a member of.

3. The method according to claim 2, wherein the at least one other group includes:
a second group, the channels of the second group having programming content which is synchronized with the event information values; and
a third group, the channels of the third group having programming content which is not synchronized with the event information values.

4. The method according to claim 3, wherein:
if the selected channel is a member of the second group, and the selected channel is selected during the first timeslot, delaying play of the programming content after receipt of the channel selection while checking the event information code for the selected channel in the first timeslot to determine if the event information code corresponds to the predetermined parameter and, if it does, displaying the request for entry of the parental control code and awaiting entry of the parental control code; and
if the selected channel is a member of the third group, delay play of the programming content after receipt of the channel selection while displaying the request for entry of the parental control code and awaiting entry of the parental control code.

5. The method according to claim 1, wherein, if the selected channel was selected within the first timeslot, delaying play of the programming content after receipt of the channel selection while checking the event information code for the selected channel in the first timeslot to determine if the event information code corresponds to the predetermined parameter and, if it does, displaying the request for entry of the parental control code and awaiting entry of the parental control code.

6. The method according to claim 1, wherein, if the selected channel was selected within the first timeslot, delaying play of the programming content after receipt of the channel selection while displaying the request for entry of the parental control code and awaiting entry of the parental control code.

7. A decoder device, comprising a processor arrangement operative to:
receive a channel selection command from a user to select a channel from a plurality of TV channels, wherein the selected channel has programming content in a plurality of timeslots, including a first timeslot including programming content within a first defined category having a higher need for parental control than the programming content in other of the plurality of timeslots;
receive a plurality of event information values including an event information code associated with a parental control rating of the programming content of the selected channel for each of the plurality of timeslots;
ascertain whether the selected channel was selected within the first timeslot or within another timeslot wherein all of the programming content is within one or more defined categories with a lower need for parental control than the programming content within the first defined category, and
(a) if the selected channel was selected within the first timeslot, delay play of the programming content after receipt of the channel selection while either (i) checking the event information code for the selected channel in the first timeslot to determine if the event information code corresponds to a predetermined parameter and, if it does, displaying a request for entry of a parental control code and awaiting entry of a parental control code, or (ii) displaying a request for entry of a parental control code and awaiting entry of a parental control code; and
(b) if the selected channel was selected within the other timeslot, allow play of the programming content on the selected channel after receipt of the channel selection without a delay to check the event information code for the selected channel in the other timeslot and, after the programming content has started playing, checking the event information code for the selected channel in the other timeslot to determine if the event information code corresponds to a predetermined parameter and, only if it does, stopping play of the programming content on the selected channel, displaying a request for entry of a parental control code and awaiting entry of a parental control code.

8. The method according to claim 7, wherein when entry of a parental control code has been requested, the programming content of the selected channel is not played until the earlier of: the parental control code being entered; and the end of the first time slot.

9. The device according to claim 7, wherein the processor arrangement is also operative to:
maintain a table, whereby the table includes a list of the plurality of TV channels, the plurality of TV channels being grouped in a plurality of groups, the groups including:
a first group, the channels of the first group not including any programming content having a critical parental control rating; and
at least one other group, the channels of the at least one other group including programming content having the critical parental control rating; and
search the table to determine which of the groups the selected channel is a member of.

10. The device according to claim 9, wherein the at least one other groups includes:
a second group, the channels of the second group having programming content which is synchronized with the event information values; and
a third group, the channels of the third group having programming content which is not synchronized with the event information values.

11. The device according to claim 10, wherein:
if the selected channel is a member of the second group, and the selected channel is selected during the first timeslot, the processor arrangement is operative to delay play of the programming content after receipt of the channel selection while checking the event information code for the selected channel in the first timeslot to determine if the event information code corresponds to the predetermined parameter and, if it does, displaying the request for entry of the parental control code and awaiting entry of the parental control code; and
if the selected channel is a member of the third group, and the selected channel is selected during the first timeslot, the processor arrangement is operative to delay play of the programming content after receipt of the channel selection while displaying a request for entry of a parental control code and awaiting entry of a parental control code.

12. The device according to claim 7, wherein, if the selected channel was selected within the first timeslot, the processor arrangement is operative to delay play of the programming content after receipt of the channel selection while checking the event information code for the selected channel in the first timeslot to determine if the event information code corresponds to the predetermined parameter and, if it does, displaying the request for entry of the parental control code and awaiting entry of the parental control code.

13. The device according to claim 12, wherein when entry of a parental control code has been requested the processor arrangement is operative such that programming content of: the selected channel is not played until the earlier of: the parental control code being entered; and the end of the first timeslot.

14. The device according to claim 7, wherein, if the selected channel was selected within the first timeslot, the processor arrangement is operative to delay play of the programming content after receipt of the channel selection while displaying the request for entry of the parental control code and awaiting entry of the parental control code.

* * * * *